Sept. 10, 1963     F. P. NOLL     3,103,158
VENTILATING DEVICE
Filed June 1, 1960     2 Sheets-Sheet 2
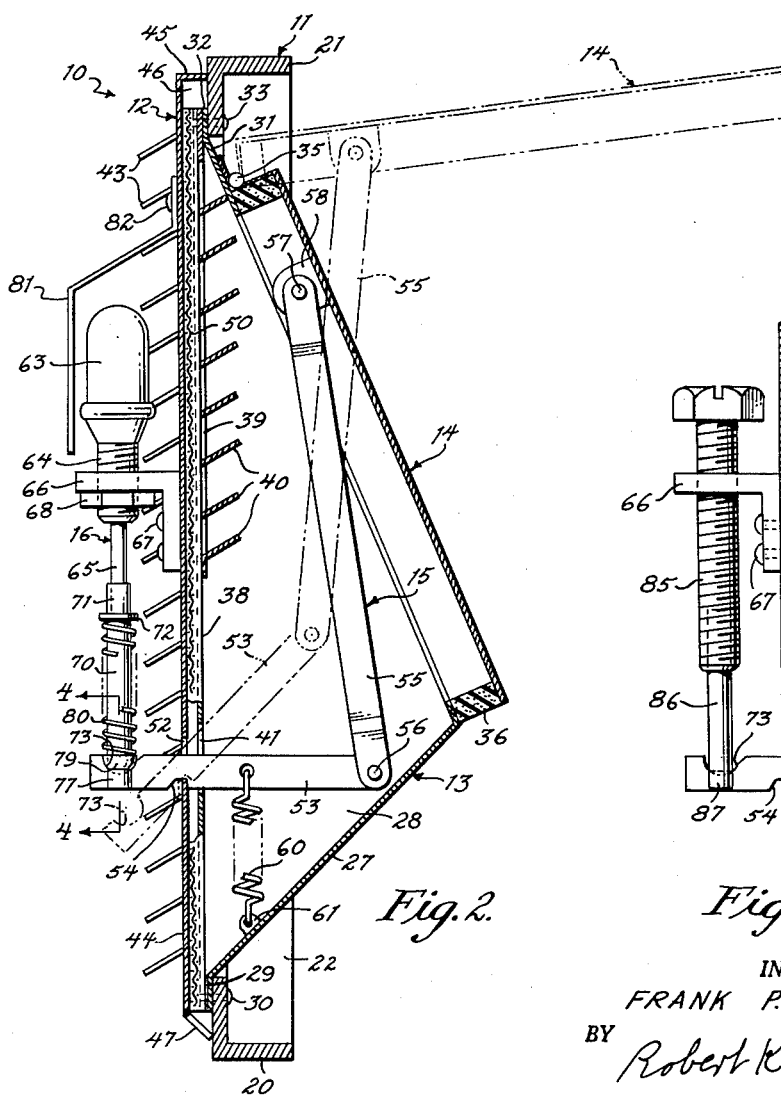
INVENTOR.
FRANK P. NOLL
BY Robert K. Youtie
ATTORNEY.

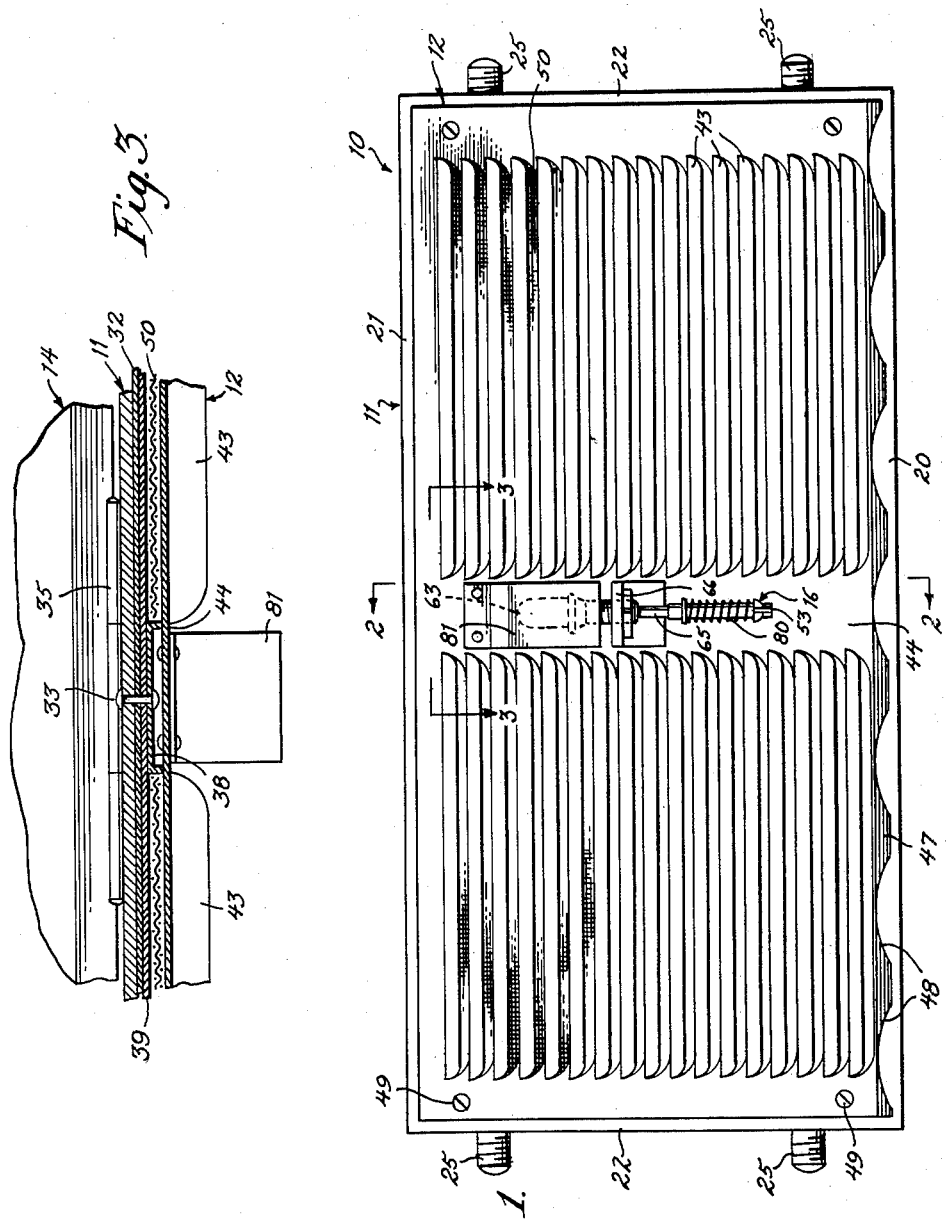

United States Patent Office 3,103,158
Patented Sept. 10, 1963

3,103,158
VENTILATING DEVICE
Frank P. Noll, 132 Chews Landing Road,
Clementon Post Office, Lindenwold, N.J.
Filed June 1, 1960, Ser. No. 33,200
7 Claims. (Cl. 98—106)

This invention relates generally to ventilating devices for use in building construction, of the general type disclosed in my prior United States Patent No. 2,814,977 issued December 3, 1957.

It is one object of the present invention to provide a ventilating device which is simpler in construction, more economical to manufacture, more durable and reliable in use, and which is highly versatile in operation, being readily selectively converted between automatic and manual operation.

It is a further object of the present invention to provide a ventilating device having the advantageous characteristics mentioned in the preceding paragraph which is more compact so as to occupy less space for effecting substantial economies in manufacture, storage, distribution and installation, as well as being effective to exclude foreign matter, such as sand, dust, rain and the like from entry through the building-wall opening.

While the device of the present invention has been primarily developed for use as a basement or attic ventilator, and will be illustrated and described hereinafter with particular reference thereto, it is appreciated that the invention is capable of many varied applications, all of which are intended to become comprehended herein.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a front elevational view showing a ventilating device constructed in accordance with the teachings of the present invention;

FIGURE 2 is a vertical sectional view taken substantially along the line 2—2 of FIGURE 1;

FIGURE 3 is a fragmentary sectional view taken substantially along the line 3—3 of FIGURE 1, somewhat enlarged for clarity of illustration;

FIGURE 4 is a fragmentary sectional view taken substantially along the line 4—4 of FIGURE 2; and FIGURE 5 is a partial view similar to FIGURE 2, but showing an alternative ventilator-actuating means.

Referring now more particularly to the drawings, and specifically to FIGURES 1 and 2 thereof, the ventilating device is there generally designated 10, and includes an open frame or bounding structure 11 across which is mounted a grille 12. Inward or rearward of the bounding structure or frame 11 and grille 12 is a housing 13. The housing 13 includes an openable closure, wall or plate 14. An operating linkage 15 is connected to the closure 14 for operating the latter responsive to actuation by temperature-sensitive actuating means 16.

The bounding structure or frame 11 may be generally rectangular and fabricated of angle stock, including lower and upper horizontal pieces 20 and 21, and a pair of side pieces 22 extending vertically between the lower and upper pieces. The angle pieces are arranged in end-to-end relation with one flange of each all in substantially coplanar relation, the remaining flanges combining to define a rearwardly extending peripheral flange about the frame or bounding structure. A pair of setscrews 25 may extend in threaded engagement through and laterally outward beyond each of the side frame pieces 22 and serve as positioning elements to hold the frame in a building-wall opening prior to calking, cementing or otherwise securing the frame in position.

The housing 13 includes a lower wall 27 extending from the lower frame piece 20 obliquely rearward and upward, and a pair of generally vertically disposed side walls 28 each extending inward from a respective frame side piece 22 and upward from the lower housing wall 27. The lower housing wall 27 may have a dependent forward-edge flange 29 secured to the upstanding flange of the lower frame piece 20, as by fasteners 30; and, the side housing walls 28 may be similarly secured to the respective adjacent side frame pieces 22. Also, a top housing member 31 may extend obliquely inward and downward from the upper frame piece 21, having an upstanding upper-edge flange 32 secured to the vertical flange of the upper frame piece by fasteners 33. If desired, the housing walls 27, 28 and 31 may be formed integrally with the bounding structure or frame 21, as by die-casting or other suitable means.

The closure member or plate 14 is hingedly connected to the upper housing wall 31, as by a hinge 35 for swinging movement between the closed, solid-line position of FIGURE 2, and the open dot-and-dash-outline position. The hinge 35 has a generally horizontally extending axis about which the closure 14 swings; and, a sealing gasket 36 of rubber, or other suitable material may be secured about the peripheral margin of the closure 14 for firm sealing engagement with the lower, side and top walls of the housing in the closed position of the closure.

A generally vertically extending, forwardly facing channel member or chimney element 38 has its lower and upper ends secured respectively to the lower- and upper-end flanges 29 and 32 of the lower and upper housing walls 27 and 31. Also, a generally rectangular inner, louvered grille 39 may be interposed between the channel 38 and the upstanding flange 32, extending across the upper forward region of the housing. The louvered element or grille 39 includes a plurality of obliquely inwardly and upwardly extending louvers or vanes 40. The channel 38 and louvered grille 39 may also be secured by the fasteners 30 and 33. In a region of the channel 38 adjacent to but spaced upward from the lower end thereof, there is formed a forwardly and rearwardly opening through slot or hole 41, for a purpose appearing presently.

Extending across the front of the bounding structure or frame 31, in front of the channel 38 and louvered element 39, is the generally rectangular grille 12. The grille 12 is formed with a plurality of obliquely forwardly and downwardly extending louvers or vanes 43, which may be stamped out or otherwise upset from the sheet material of the grille. A vertically extending medial region 44 of the grille 12, located just in front of the channel 38, is not formed with vanes or louvers, but remains imperforate. Along the upper edge of the grille 12 is formed a rearwardly extending upper-edge flange 45, while a rearwardly extending side-edge flange 46 is formed along each side edge of the grille. Along the lower edge of the grille 12 is formed an obliquely downwardly and inwardly extending lower-edge flange 47, which may be scalloped, or otherwise formed with a plurality of lower-edge cutouts 48. The edge flanges 45, 46 and 47 of the grille 12 extend rearward into engagement with the front wall of the frame structure 11; and, the grille 12 is secured in position by a plurality of fasteners 49 extending inward through the grille into the frame structure. Preferably insect screening 50 is secured on the inner surface of the grille 12, as by spot-welding or other suitable means.

If desired, say for purposes of field assembly, the housing 13, channel 38, and louvered element 39 may be assembled together, but separate from the frame structure 11. At the time of installation, the housing assembly may be placed in the frame structure 11, with the grille 12 arranged in front, and the grille and housing assembly together secured to the frame structure by fasteners 49. If desired, the louvered element 39 may be omitted when the grille 12 is also louvered.

The unlouvered medial portion 44 of the grille 12 is provided with a forwardly and rearwardly opening through slot or hole 52 in registry with the channel opening 41. A rocker arm or lever 53 of the operating linkage 15 extends forwardly and rearwardly through the registering openings 41 and 52, having its forward end in front of the grille 12 and its rearward end behind the grille within the housing 13. A downwardly facing notch 54 is formed in the lever 53 and receives the lower edge of the grille opening 52, the latter forming a fulcrum to mount the lever for rocking movement about a generally horizontal, laterally extending axis. That is, the ends of lever 53 are movable generally up and down upon rocking movement of the lever 53. Interiorly within the housing 13 is a link 55 having its lower end pivoted, as at 56 to the rear end of the lever 53, and having its other end pivoted, as at 57, to an ear 58 fixed interiorly to an upper region of the closure 14. Thus, downward movement of the forward end of lever 53 is effective to swing the closure 14 from its closed, solid-line position, to its open, dot-and-dash-outline position. Suitable resilient means, say in the form of a tension spring 60 serves to resiliently bias the closure 14 toward its closed position. Specifically, the spring 60 may be arranged interiorly of the housing 13, having one end connected to the lever 53 between the fulcrum-receiving cutout 54 and the inner lever end, and depending for anchorage to a lug 61 fixed to a lower interior region of the housing. Thus, the spring 60 serves to resiliently draw the inner end of the lever 53 downward, and through the link 55 to tightly close the closure plate 14 and effectively seal the housing. The actuating means 16 includes a temperature-responsive element 63 which contains a mixture of wax and metal fines operable upon a change of state by the wax to exert force or pressure on a diaphragm. This temperature-sensitive element is conventional and sometimes called by the trademark "Vernatherm." Depending from the casing of the temperature-sensitive device 63 there may be an externally threaded sleeve 64 receiving a depending plunger 65. In such temperature-responsive devices it is essential that a predetermined, minimum external pressure be exerted at all times upon the diaphragm, as through the plunger 65. A bracket 66 is fixed to the medial portion 44 of the grille 12, as by fasteners 67, and extends outward from the grille, threadedly receiving the vertically disposed sleeve 64. A locknut 68 may be provided on the sleeve 64 to fix the latter in any selected position of adjustment relative to the bracket 66.

Interposed between the lower end of the plunger 65 and the forward end of the lever 53 is an extension rod or pusher rod 70. The pusher rod 70 has its upper-end region 71 axially bored or cupped to slidably receive the lower-end portion of the plunger 65, and is provided with an annular external shoulder or abutment 72 adjacent to and spaced below the upper end of the pusher rod. The forward-end region of the lever 53 is formed on its upper edge with a generally semicircular or arcuate cutout 73; and, the lower end of the pusher rod 70 is bifurcated or forked to engage in the cutout 73 and straddle the forward-end region of the lever. More specifically, see FIGURE 4, the lower-end region of the pusher rod 70 is formed with an end slot 75 terminating in an edge 76 and defining on opposite sides of the slot a pair of legs 77. The downwardly facing inner surface or edge 76 of the slot 75 engages or bears against the arcuate edge of cutout 73, while the legs 77 will fit freely astride the forward region of the lever 53. A generally semispherical head or body 79 is circumposed about and freely slidable on the pusher rod 70, and conformably received in the generally semicircular cutout 73. Suitable resilient means urges the head 79 downward relative to the pusher rod 70, such as a coil compression spring 80 circumposed about the pusher rod and having its opposite ends in bearing engagement with the shoulder 72 and the upper, generally flat surface of the head.

By this floating connection between the pusher rod 70 and lever 53, it will be apparent that substantially vertical downward movement of the pusher rod 70, as effected by the plunger 65, will cause counterclockwise rotation of the lever 53 without binding. Further, at elast a predetermined minimum upward force is maintained at all times on the plunger 65, as by the force of spring 80 exerted through the shoulder 72 and pusher rod 70.

A protective cover or shield 81 may be arranged over the temperature-sensitive device 63, being fixed to the grille 12 by fastener means 82, to protect the temperature-sensitive device from the elements.

At installation, the temperature-sensitive element 63 is adjusted in the bracket 66 so as to just initiate opening of the closure 14 at fifty-five degrees Fahrenheit. The temperature-sensitive element 63 is then rotated upward about one half revolution, and locked in position by the locknut 68. In this condition, the opening of the closure 14 will be initiated at about fifty-five degrees, and full opening achieved at about seventy degrees. Of course, throughout all positions of the closure 14, the spring 60 acts to maintain pressure against the plunger 65. Hence, the spring 80 may be eliminated if it is desired to rely entirely upon the spring 60. However, should the spring 60 become distended, or otherwise reduced in effectiveness, the spring 80 will serve to maintain the desired force upward against the plunger 65.

With the louvered element 39 in the position illustrated in FIGURE 2, a wide variety of forward or outer grilles may be substituted for the grille 12 without danger of foreign matter such as rain water passing entirely through the ventilator. That is, even if rain enters into the housing 13 below the louvered element 39, such rain will fall upon the lower housing wall 27 and drain therefrom forward and downward for exit through the cutouts 48. Hence, a wide variety of ornamental grilles may be employed, if desired.

In addition to the external shield 81 protecting the temperature-sensitive element 63 from, say direct rays of the sun, the channel 38 combines with the grille region 44 to define therebetween an airspace serving to insulate the temperature-sensitive element from accumulated heat within the housing.

In the alternative form of FIGURE 5, the actuating mechanism 16 and its shield 81 may be eliminated. In place thereof a threaded bolt 85 may be threadedly engaged vertically downward through the bracket 66 and have its lower-end region bored for freely receiving the upper end of a pusher rod 86. The lower end 87 of the pusher rod is bifurcated for engagement astride the forward region of lever 53. Obviously, the closure 14 may then be selectively positioned as desired by mere rotation of the bolt 85 to the necessary vertical location.

From the foregoing it is seen that the present invention provides a ventilator which fully accomplishes its intended objects, being highly versatile in use, effectively excluding foreign matter, such as rain and dirt, providing maximum open area for flow of ventilating medium, and effecting tight closure and seal when desired.

Although the present invention has been described in some detail by way of illustration and example for purposes of clarity of understanding, it is understood that certain changes and modifications may be made within the spirit of the invention and scope of the appended claims.

What is claimed is:

1. A ventilating device for a building-wall opening comprising an open bounding structure for insertion in a building-wall opening, a grille extending across said bounding structure, a lower wall extending upward and inward from a lower region of said bounding structure, side walls extending inward from opposite sides of said bounding structure to said lower wall, a closure swingably mounted on an upper region of said bounding structure and gravitationally urged to a position extending downward and inward into closing relation with said lower and side walls, said closure being swingable upward against gravity away from said lower and side walls to an open position, an operating linkage having one end connected to said closure and having its other end extending exteriorly of said grille, and actuating means carried exteriorly of said closure for actuating said linkage to position said closure, said grille being spaced from the forward end of said lower wall and the lower region of said bounding structure for gravity removal of foreign matter from said lower wall exteriorly of said bounding structure.

2. A ventilating device according to claim 1, in combination with louvers within an upper region of said bounding structure slanting obliquely upward and inward, said louvers serving to obstruct the entry of rain through said bounding structure except onto said lower wall.

3. A ventilating device according to claim 1, said actuating means being manual for selective opening and closing of said closure.

4. A ventilating device according to claim 1, said actuating means comprising a threaded member operatively connected between said grille and lever for opening and closing of said closure.

5. A ventilating device for a building-wall opening comprising an open bounding structure for insertion in a building-wall opening, a grille extending across said bounding structure, a lower wall extending upward and inward from a lower region of said bounding structure, side walls extending inward from opposite sides of said bounding structure to said lower wall, mounting means for swingably securing a closure to an upper region of said bounding structure, a closure mounted on said mounting means and gravitationally urged to a position extending downward and inward into closing relation with said lower and side walls, said closure being swingable upward against gravity away from said lower and side walls to an open position, an operating linkage, and actuating means carried exteriorly of said grille for actuating said linkage to position said closure, said linkage comprising a lever extending through said grille having its opposite ends respectively outward and inward of said grille and pivotally mounted intermediate its ends for swinging about a generally horizontal axis, the outer end of said lever being connected to said actuating means, and said linkage means comprising a link connecting the inner end of said lever and said closure at a location downward of the closure-mounting means for actuation of said link against the weight of said closure in all closure positions, said actuating means comprising a thermal-responsive element mounted on said grille and connected to said linkage for positioning said closure in response to ambient temperature, and a shield over the exterior of said actuating means to exclude direct sunlight from operating said actuating means.

6. A ventilating device for a building-wall opening comprising an open bounding structure for insertion in a building-wall opening, a grille extending across said bounding structure, a lower wall extending upwardly and inwardly from a lower region of said bounding structure, side walls extending inwardly from opposite sides of said bounding structure to said lower wall, mounting means for swingably securing a closure to an upper region of said bounding structure, a closure mounted on said mounting means and gravitationally urged to a position extending downwardly and inwardly into closing relation with said lower and side walls, said closure being swingable against gravity upward away from said lower wall to an open position, a lever extending through a lower region of said grille having its ends on opposite sides of said grille and rockably mounted for up-and-down movement of its ends, a link connected between the inner end of said lever and said closure at a location downward of said mounting means for opening and closing said closure upon respective downward and upward movement of the outer lever end, and temperature-responsive actuating means outward of said grille and connected to the outer end of said lever for moving the latter responsive to ambient temperature change, said actuating means comprising a rod axially movable responsive to temperature change, and a floating connection between said rod and lever to permit swinging movement of the latter upon axial movement of said rod.

7. A ventilating device according to claim 6, said floating connection comprising an edge on said rod bearing against said lever in a direction to rotate the latter, a bearing member slidably carried by said rod and bearing against said lever in said direction, and resilient means connected between said rod and bearing member urging the latter in said direction under predetermined force to insure the application of at least said predetermined force against said rod.

References Cited in the file of this patent

UNITED STATES PATENTS

| 446,824 | Tousley | Feb. 17, 1891 |
| 960,548 | Hewitt | June 7, 1910 |
| 1,358,193 | Fulton | Nov. 9, 1920 |
| 1,926,120 | Snediker | Sept. 12, 1933 |
| 2,057,494 | Leigh | Oct. 13, 1936 |
| 2,360,952 | Leigh | Oct. 24, 1944 |
| 2,516,879 | Huszagh | Aug. 1, 1950 |
| 2,596,257 | Leigh | May 13, 1952 |
| 2,814,977 | Noll | Dec. 3, 1957 |
| 2,847,928 | Glass | Aug. 19, 1958 |
| 2,987,256 | Wood et al. | June 6, 1961 |